United States Patent [19]
Golin

[11] Patent Number: 5,331,414
[45] Date of Patent: Jul. 19, 1994

[54] METHOD AND APPARATUS FOR ENCODING A DIGITAL MOTION VIDEO SIGNAL USING PYRAMID SPECIFIC FILTERING

[75] Inventor: Stuart J. Golin, East Windsor, N.J.

[73] Assignee: Intel Corporation, Santa Clara, Calif.

[21] Appl. No.: 813,884

[22] Filed: Dec. 23, 1991

[51] Int. Cl.$^5$ ............................................. H04N 7/12
[52] U.S. Cl. ..................................... 348/390; 348/417
[58] Field of Search ................. 358/133, 136, 135, 56; H04N 7/12, 7/13

[56] References Cited
U.S. PATENT DOCUMENTS

| | | | |
|---|---|---|---|
| 4,268,861 | 5/1981 | Schreiber et al. | 358/138 |
| 4,692,806 | 8/1987 | Anderson et al. | 358/209 |
| 4,718,104 | 1/1988 | Anderson | 382/41 |
| 4,785,349 | 11/1988 | Keith et al. | 358/136 |
| 4,853,779 | 7/1989 | Hammer et al. | 358/133 |
| 4,864,396 | 9/1989 | Martens | 358/133 |
| 4,941,042 | 7/1990 | Martens | 358/133 |
| 5,020,120 | 5/1991 | Weldy | 382/56 |
| 5,050,230 | 9/1991 | Jones et al. | 358/166 X |
| 5,067,015 | 11/1991 | Combridge et al. | 358/133 |

OTHER PUBLICATIONS

Rosenfeld, A. and Kak, A.C., "Digital Picture Processing" Second Edition, Academic Press, Inc., vol. 2, pp. 112–121.

Pei, S. and Chen F.; "Subband Decomposition of Monochrome and Color Images by Mathematical Morphology", Optical Engineering, vol. 30, No. 7, Jul. 1991, pp. 921–933.

Primary Examiner—Victor R. Kostak
Attorney, Agent, or Firm—Carl L. Silverman; William H. Murray; Daniel H. Golub

[57] ABSTRACT

An image having at least one high frequency feature is encoded by (a) filtering the image to produce a filtered image representing the image minus the at least one high frequency feature; (b) resolving the filtered image into at least one lower level of resolution; (c) encoding a correction image at the at least one lower level of resolution; (d) producing an expanded result image having the same the level of resolution of the image; and (e) encoding at the level of resolution the image the difference between the image and the expanded result image.

14 Claims, 6 Drawing Sheets

METHOD AND APPARATUS FOR ENCODING A DIGITAL MOTION VIDEO SIGNAL USING PYRAMID SPECIFIC FILTERING

FIELD OF THE INVENTION

This invention relates to video signal processing generally and particularly to systems for encoding a compressed digital video signal representative of a full color video signal.

BAKCGROUND OF THE INVENTION

A digital picture may be considered as an array of $M \times N$ pixels which are each represented by a given number of (for example b) bits. Thus, a total number of $M \times N \times b$ bits is required for the representation of a picture. For example, an array of $576 \times 536$ pixels using 8 bits per pixel requires approximately $2.5 \times 10^6$ bits for its representation. If the pixels of this array are coded independently of each other, such an array is referred to as the canonical form of the digital picture, or the canonical picture for short.

A television transmission system using pyramidal coding comprises a pyramidal coding circuit and a pyramidal decoding circuit. The pyramidal coding circuit is provided with a decimation circuit for resolving the canonical form into lower levels of resolution. The decimation circuit receives the canonical $M \times N$ picture and supplies $K+1$ auxiliary pictures $B_0, B_1 \ldots B_K$ in which the numbers of horizontal and vertical pixels of the auxiliary picture $B_K$ are smaller by factors $A_H$ and $A_v$ than those of the auxiliary picture $B_{K-1}$; ($k=1, 2, \ldots K$).

The coding circuit further comprises a picture expansion circuit which is provided with a plurality of expansion channels each receiving a different auxiliary picture $B_K$. Each expansion channel is adapted to perform a two-dimensional interpolating low-pass filtering function for converting the auxiliary picture $B_K$ applied thereto into an expanded auxiliary picture $B'_K$ whose number of horizontal and vertical pixels is equal to that of $B_{K-1}$. The auxiliary pictures $B_K$ as well as the expanded auxiliary pictures $B'_K$ are subsequently applied to a circuit forming a difference picture. This circuit supplies difference pictures $D_K$. Such a difference picture $D_K$ is obtained by subtracting the expanded picture $B'_{K+1}$ from the auxiliary picture $B_K$.

$B_K$ and the difference pictures $D_K$ are then transmitted to the pyramidal decoding circuit which is adapted to supply a duplicate of the picture $B_0$ representing the original picture. This pyramidal decoding circuit comprises a cascade arrangement of a plurality of local expansion channels for forming a sum picture from different difference pictures $D_K$. Like the expansion channels in the pyramidal coding circuit, each local expansion channel is also adapted to perform a two-dimensional interpolating low-pass filtering function.

Such a local expansion channel receives the auxiliary picture $B_K$, expands it to an expanded auxiliary picture $B'_K$ whose numbers of horizontal and vertical pixels is equal to those of the difference picture $D_{K-1}$. In a circuit forming a sum picture this difference picture $D_{K-1}$ and this expanded auxiliary picture $B'_K$ are added together Consequently the auxiliary picture $B_{K-1}$ is obtained again. This auxiliary picture $B_{K-1}$ is in turn expanded again and the expanded form is added to $D_{K-2}$ so that the auxiliary picture $B_{K-2}$ is obtained, etc. This operation is continued until the original picture $B_0$ is obtained again.

The dynamic range of the difference pictures $D_0$ to $D_{K-1}$ will generally be much smaller than that of the auxiliary pictures. As a result, fewer bits will be necessary for their coding than for the individual auxiliary pictures. It is possible to further decrease the number of bits of a difference picture to be transmitted. All these measures ensure that the total number of bits required to represent a complete picture is considerably lower than for the canonical picture.

In general, pyramid encoding provides an effective means for encoding images. The low frequency components of an image are thus encoded at low resolution and higher frequency components are encoded at higher levels of resolution or at the full resolution level. Since most of the energy of the image is usually at low frequency, most of the image is encoded with relatively few bits. In such cases, full resolution encoding is needed only to sharpen up the image.

In pyramid encoding, low resolution images are produced by subsampling higher resolution images. Prior to subsampling, a low pass filter is applied to remove all frequencies above half of the folding or Nyquist frequency. It was found, however, that pyramid encoding utilizing such filtering proved counter-productive in encoding certain images. In such cases, images produced by the decimation circuitry typically required more bits to encode than the actual full resolution image. Specifically, it was found that images involving high frequency features such as points, thin lines or thin curves required higher than optimal numbers of bits to encode using known pyramid encoding techniques.

The disadvantages introduced when pyramid encoding is applied to an image having a high frequency feature such as a point, thin line or thin curve are illustrated by the example shown in FIGS. 1A, 1B, 1C, 1D, 1E and set forth below. The example considers a pair of impulses found in a one-dimensional signal. It is understood that the example may be extended to a two-dimensional signal which includes a thin line or curve. Referring now to FIG. 1A, there is shown a signal X which has only two non-zero points 110, 120. Signal XF (shown in FIG. 1B) results when X is filtered with a low pass (1, 2, 1) filter. Signal XF (shown in FIG. 1C) is then subsampled using 2:1 subsampling to yield $XF_S$. In typical pyramid encoding, $XF_3$ is then encoded. To determine the remaining image which must be encoded at full resolution in order to reproduce the complete image during decoding, $XF_3$ is linearly expanded (interpolated) back to full resolution, yielding $XF_{si}$ (shown in FIG. 1D). X is then subtracted from $XF_{si}$ to yield a difference signal XH, (shown in FIG. 1E) which is encoded at full resolution.

As illustrated above, use of pyramid encoding to encode impulses 110, 120 actually increases the number of bits needed to encode the image. More particularly, there were only two non-zero points 110, 120 which needed to be encoded in the full resolution image X. However, application of pyramid encoding to original image X yielded $XF_3$ (having three non-zero points 130, 132,134) and XH (having 8 non-zero points 140, 142, 144, 146, 148, 150, 152, 154). Thus, the number of non-zero points to be encoded increased from two to eleven as a result of pyramid encoding. It was found that this increase in encoded points could not be lessened by substituting other known filters, such as a sinc filter, for the (1, 2, 1) filter referenced in the paragraph above. On the contrary, such filters only exacerbated the problem by creating more non-zero points (or ripples) which required encoding. It was also found that in addition to increasing the number of bits required for encoding, the pyramid encoding method also decreased image quality in such cases often resulting in visible errors. This degradation in image quality resulted from a combination of two conditions: (1) the fact that encoding is generally inexact, and (2) the fact that, in the case of an impulse, pyramid encoding requires the encoding of pixels some distance from the impulse, e.g. see non-zero points 140, 48. These conditions often result in errors which occur some distance from an impulse in a smooth area of the image where the eye is especially sensitive to such errors.

In view of the inefficiencies introduced when known pyramidal encoding techniques are applied to images having high frequency features such as impulses, points, thin lines or thin curves, it is an object of the present invention to provide an efficient means for encoding images containing such high frequency features using pyramidal encoding.

It is a further object of this invention to provide means for filtering high frequency features within an image to be encoded.

Further objects and advantages of the invention will become apparent from the description of the invention which follows.

SUMMARY OF THE INVENTION

The present invention is directed to meeting the need for a compression system for providing a compressed digital video signal representative of a full motion color video signal, which is suitable for recording or transmission using relatively narrow band media and which may be decompressed at speeds at least equal to conventional 30 frame-per-second full motion color video frame rates. In accordance with the present invention, an image having at least one high frequency feature is encoded by (a) filtering the image to produce a filtered image representing the image minus at least one high frequency feature; (b) resolving the filtered image into at least one lower level of resolution; (c) encoding a correction image at at least one lower level of resolution; (d) producing an expanded result image having the same level of resolution as the image; and (e) encoding at the level of resolution of the image, the image minus the expanded result image.

DETAILED DESCRIPTION OF THE PREFERRED EMBODIMENT

Figure 1A:
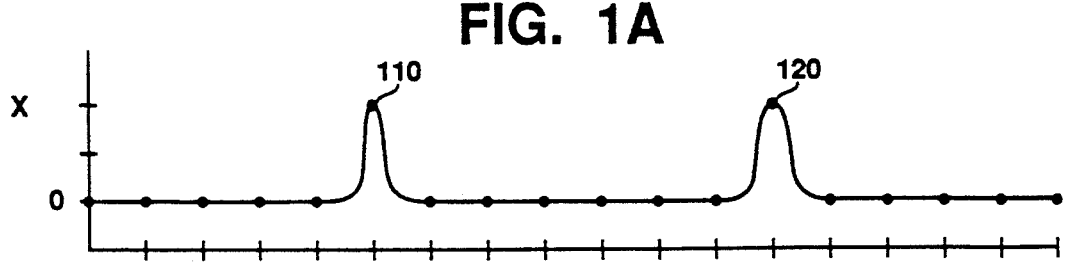
FIG. 1 shows the decimation and encoding of a one-dimensional signal using conventional pyramidal encoding.
Figure 1B:
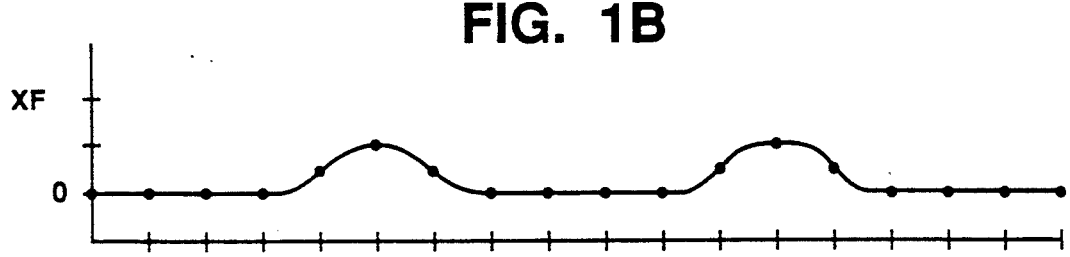
Figure 1C:
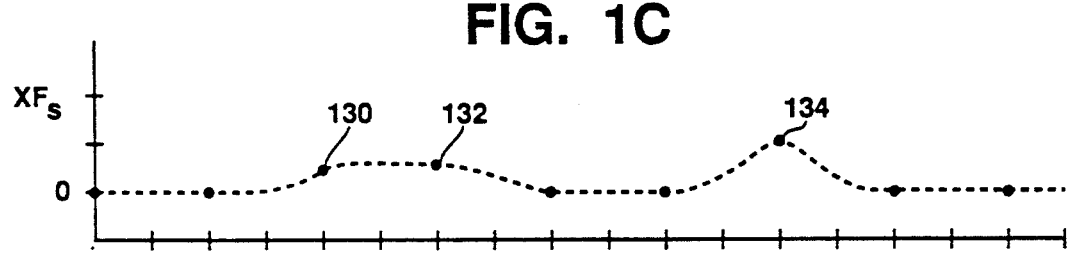
Figure 1D:
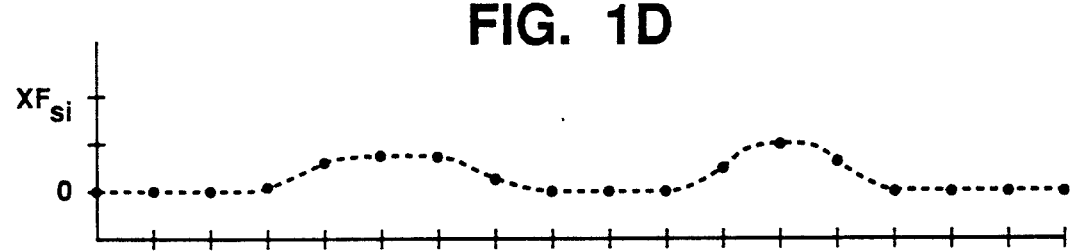
Figure 1E:
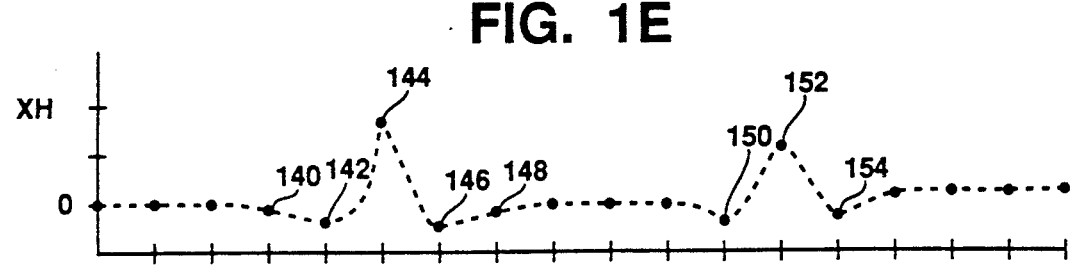
Figure 2:
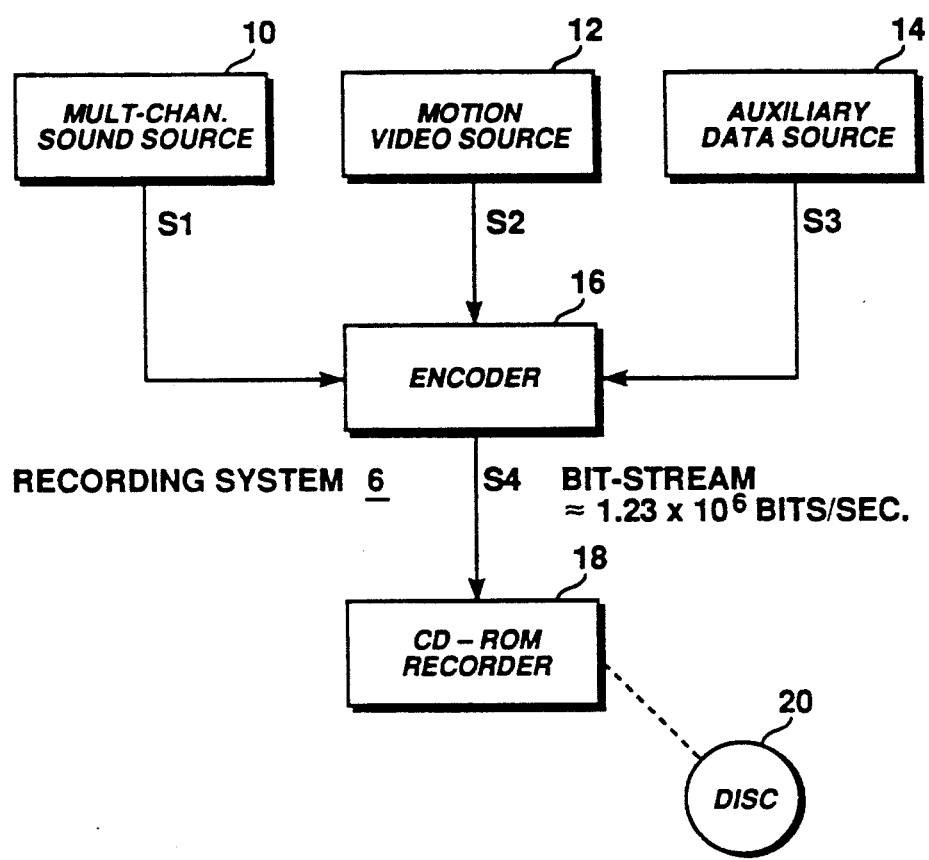
FIG. 2 shows a block diagram of a digital video system embodying the present invention.

The digital video interactive system of FIG. 2 comprises a recording system 6 having sources 10, 12 and 14 which provide, respectively, a multi-channel sound signal S1, a color motion video signal S2 and an auxiliary data signal S3. An encoder 16 encodes and combines signals S1, S2 and S3 to form a digital recording signal S4 (hereinafter, "bit-stream") that is recorded on a compact disc read-only memory (CD-ROM) disc 20 by means of a CD-ROM recorder 18. Auxiliary da signal S3 may comprise interactive data associated with the video or audio signals or some other type of digital data which may be independent of the audio or video data.

The average data rate of the bit-stream S4 is controlled by a selection of encoding parameters to achieve a desired bit rate. A typical value of the desired bit rate may equal the standard CD-ROM record/playback bit-rate of about 1.2 mega-bits per second. The parameters are selected so as to enable recording of up to one hour of full-motion digitally encoded color video, multi-channel digital audio and auxiliary data on CD-ROM disc 20.

The encoding of the digital full-motion color video portion of the recording signal to meet the relatively low channel capacity of the CD-ROM disc player requires very substantial data reduction. The selection of the individual processes, the selection of the share of data reduction provided by each and the selection of variable compression parameters (e.g., thresholds and operating modes) represents critical choices in meeting the objective of encoding full motion color video for storage on CD-ROM, digital audio tape (DAT) or other bandwidth limited media. Such choices depend on more than merely the channel capacity of the media. They depend as well on variables such as the video frame rate, the desired spatial resolution, certain specific characteristics of the video image content and on parameters of the decoder that is ultimately used for reconstituting the image. The coding for each frame is selected to enable a video decoder (not shown) to meet the strict requirement of completing all decoding tasks assigned to it in real time, that is, within one video frame interval on the average.

Encoder 16 employs intra-frame coding for still images (e.g. photographs) and for the first image of a motion video scene. Intra-frame coding may employ pyramidal image coding techniques, and, as described more fully below, in the case of certain images having high frequency features, pyramid specific filtering can be employed in connection with pyramidal encoding techniques to further enhance intra-frame coding. Pyramid specific filtering can also be employed to further enhance inter-frame coding used for the second and subsequent frames of a motion video sequence. Compressor 16 has been implemented by programming an 8-node Intel Hypercube model i860. Compression speeds of a few seconds per frame per node have been achieved for typical motion video sequences. The principal goal of compressor 16 is not speed but rather is high quality for the images that are ultimately displayed.

As noted above, in addition to its use in connection with still images (e.g. photographs) and the first image of a motion video sequence, it may be desirable from time to time to use intra-frame coding in connection with certain images warranting special treatment in order to enhance the quality of the displayed video. An example of such an image is one which contains a substantial amount of fast and/or uncoordinated motion.

Such an image may be encoded at multiple levels resolution using pyramid encoding.

In encoding an image at multiple levels of resolution, it may also be desirable from time to time to remove certain "high frequency features" from the image prior to forming the multiple resolution images which result from decimation of that image. Examples of such high frequency features will be found in images which include thin lines, thin curves or isolated points. In a preferred embodiment of the present invention, lines smaller than approximately one to two pixels thick and points smaller than approximately one to two pixels in diameter are removed prior to decimation. According to the present invention, high frequency features of other sizes may be removed prior to decimation of an image when such features are of a size or dimension that conventional pyramid encoding could be enhanced by the removal of such features prior to decimation of an image.

Figure 3A:
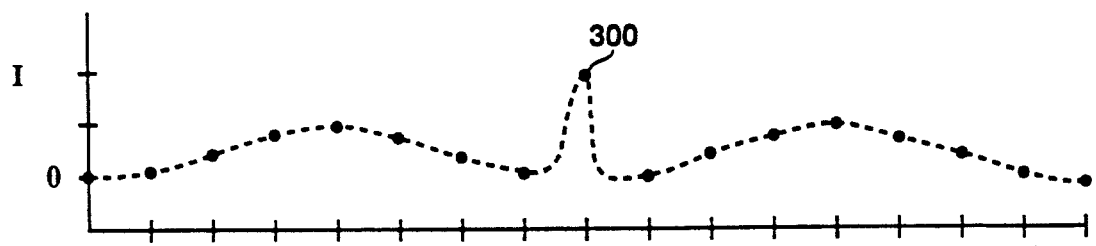
FIGS. 3A-3E show the decimation and encoding of a one-dimensional signal according to the present invention.
Figure 3B:
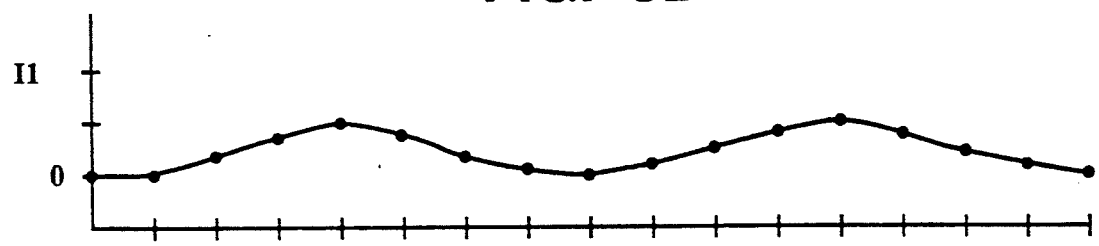
Figure 3C:
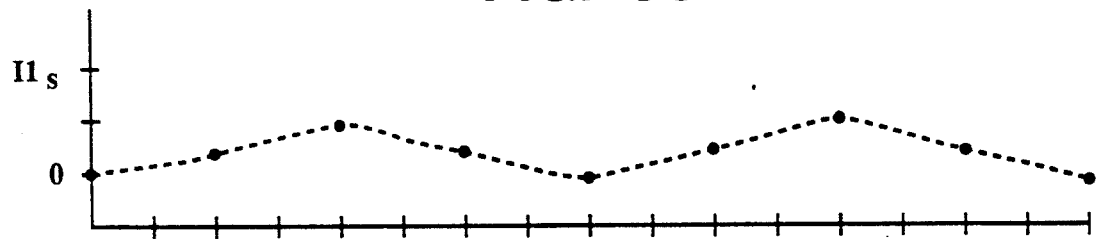
Figure 3D:
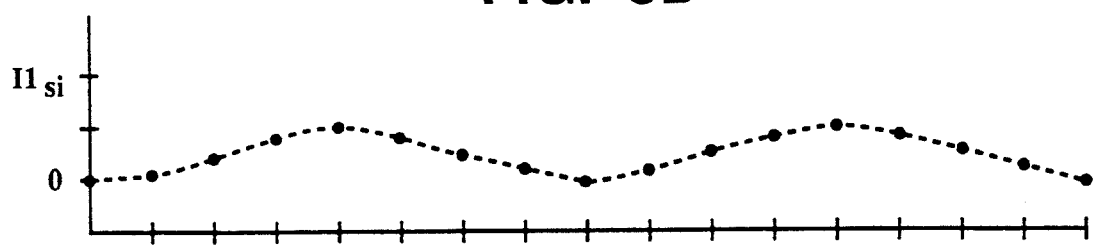
Figure 3E:
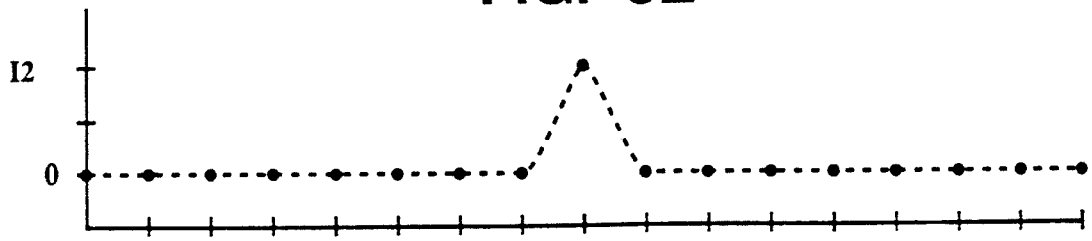

By way of introduction, there is shown in FIGS. 3A, 3B, 3C, 3D, 3E the decimation and encoding of a one-dimensional signal I (shown in FIG. 3A) having high frequency feature 300 according to the present invention. Signal I is first filtered to obtain signal I1 (shown in FIG. 3B). Signal I1 is next passed through a low pass filter and subsampled with 2:1 subsampling to produce $I1_3$ (lower resolution correction signal) for encoding signal $I1_3$ is shown in FIG. 3C. A correction signal at any level of resolution is the signal that is encoded at that level of resolution after the encoding of any lower levels of resolution. Signal I1, is then expanded (interpolated) back up to full resolution thereby yielding $I1_{si}$ (expanded result signal). Signal $I1_3$ is shown in FIG. 3D. Signal I2 (shown in FIG. 3) for encoding is obtained by subtracting signal I from signal $I1_{si}$. By removing high frequency feature 300 from signal I prior to the decimation of that signal into $I_i$, the example works to encode high frequency feature 300 only at full resolution, thereby minimizing the total number of non-zero points to be encoded at all resolution levels.

Figure 4:
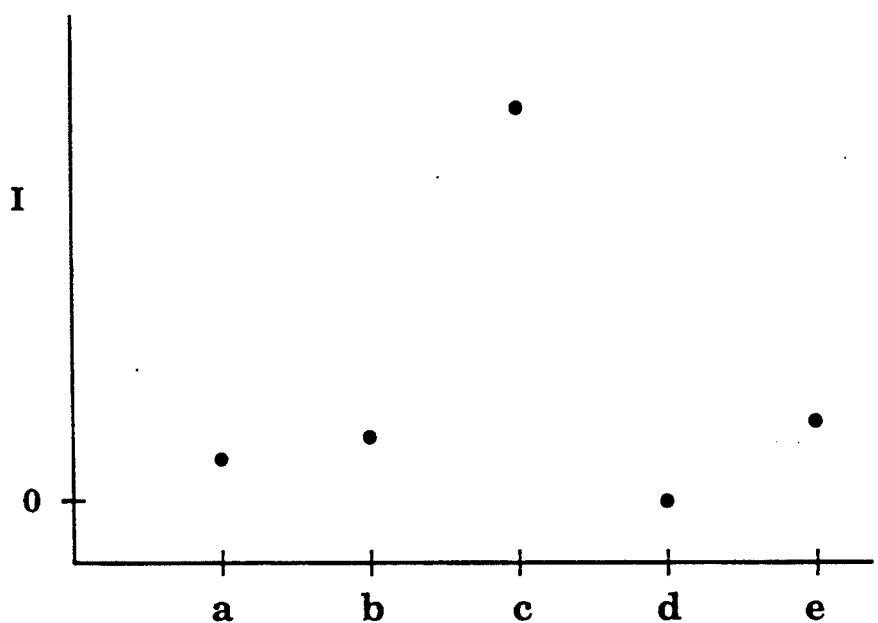
FIG. 4 shows a portion of a one-dimensional signal to be filtered by a pyramid specific filter according to the present invention.

In deriving signal I1 from signal I, the present invention uses a pyramid specific filter which is particularly effective in removing high frequency features about one pixel thick. By way of example, there is shown in FIG. 4 a portion of a one-dimensional signal I which may be operated upon by a pyramid specific filter according to the present invention to obtain a correction signal such as $I1_3$ described in the paragraph above. Broadly speaking, for each pixel in signal I, the pyramid specific filter calculates the mean and variance of surrounding pixels. Based on these mean and variance values a weight is calculated and used to compare the selected pixel with its nearest neighbors. Referring now to FIG. 4, for test pixel c, the mean, m, and variance, v, of the surrounding pixels a, b, d, e are calculated. From these values, weight, w is calculated as follows:

$$w = exp(-k*(c-m)^2/v)$$

In the above expression, k is a constant having a typical value of 0.3. A value c' representing the corresponding value of pixel c in a correction signal is then calculated using surrounding pixels b and d as follows:

$$c' = w*c + (1-w)*(b+d)/2$$

If c is a few standard deviations or more from its neighbors, then it will be heavily filtered by the above processing. Alternatively, if c is less than one standard deviation from its neighbors, it will only be slightly filtered.

Although the examples of FIGS. 3 and 4 show application of the present invention to a one-dimensional signal, these examples were given for illustration only and it is to be understood that the present invention also applies to images in two-dimensions such as those used to represent digital video images. In addition, although in the above example high frequency feature 300 was found at full resolution, it should also be understood that application of the present invention is not limited to high frequency features found at full resolution. The method of the present invention may also be applied where such high frequency features are found at resolution levels lower than full resolution thereby enhancing encoding at the lower levels of a decimation pyramid. Application of the present invention to images found at lower levels of a decimation pyramid may be used in connection with points, lines or other features which appear thick at full resolution, but which are increasingly thinned in each succeeding lower level of an image decimation pyramid.

It should also be understood that the method of the present invention may be applied in conjunction with encoding based on motion compensation, to encode interframe predicted or error image information having high frequency features. For example, the present invention may be applied to encode an interframe error image with a high frequency feature, where the interframe error image represents the difference between a predicted image obtained through motion compensation analysis and a target or desired image. Alternatively, the present invention may be applied to encode an interframe error image with a high frequency feature, where the interframe error image represents the difference between a preceding image and a target or desired image.

Finally, it should be recognized that the present invention can be applied to enhance image analysis. Thus, image identification in an automated factory environment could be enhanced by using a pyramid specific filter according to the present invention to analyze images containing high frequency features. For example, an image having at least one high frequency feature could be filtered to remove the high frequency feature and that filtered image then analyzed. Alternatively, an image having at least one high frequency feature could be filtered to remove the high frequency feature and the difference between the original image and the filtered image could be analyzed. Moreover, image analysis at multiple levels of resolution could be combined with the present invention to enhance image identification where, for example, an image being identified contains a feature which is more easily detectable at a resolution level lower than full resolution. Thus, an image having at least one high frequency feature could first be filtered to remove the high frequency feature, the filtered image could then be resolved into at least one lower level of resolution and analyzed at that lower level of resolution. Alternatively, an image having at least one high frequency feature could first be filtered to remove the high frequency feature, the filtered image could then be resolved into at least one lower level of resolution and the difference between the original image and an expansion of the lower level resolution image then analyzed.

In a further alternative embodiment of a pyramid specific filter according to the present invention, lines and edges in an unfiltered image are identified and thereafter targeted filtering is applied only in the vicinity of the lines. In the one dimensional example shown in Table I below, the transitions from 0 to 4 and from 4 to 0 exemplify the occurrence of edges, while the transition from 4 to 8 to 4 exemplifies a point.

TABLE I

| Image: | 0 | 0 | 0 | 4 | 4 | 4 | 4 | 8 | 4 | 4 | 4 | 0 | 0 | 0 |
|---|---|---|---|---|---|---|---|---|---|---|---|---|---|---|

It is to be understood that the point represented in Table I would represent a line in a two dimensional image. In order to distinguish edges from points (or lines), two filters are applied pixel-by-pixel to the Image signal. More particularly, f_line=(−0.5, 1, −0.5) is applied to Image to detect points and f_=(−0.5, 0, +0.5) is applied to Image to detect edges therein. Once f_line and f_edge have been determined, the routine described in Table II below is applied to derive an intermediate signal LineFilter:

TABLE II

If (If ABS(f_edge) >= ABS(f_line) )   Line Filter = 0
Else
    If (f_line > 0) LineFilter = f_line − ABS(f_edge)
    Else LineFilter = f_line + ABS(f_edge)

A filtered signal Image is then derived by subtracting LineFilter from Image. By way of illustration, for the Image signal of Table I, f_line, f_edge, LineFilter and Image' would be as follows:

TABLE III

| Image: | 0 | 0 | 0 | 4 | 4 | 4 | 4 | 8 | 4 | 4 | 4 | 0 | 0 | 0 |
|---|---|---|---|---|---|---|---|---|---|---|---|---|---|---|
| f-line: |  | 0 | −2 | 2 | 0 | 0 | −2 | 4 | −2 | 0 | 2 | −2 | 0 |  |
| f-edge: |  | 0 | 2 | 2 | 0 | 0 | 2 | 0 | −2 | 0 | −2 | −2 | 0 |  |
| LineFilter: |  | 0 | 0 | 0 | 0 | 0 | 0 | 4 | 0 | 0 | 0 | 0 | 0 |  |
| Image': | 0 | 0 | 0 | 4 | 4 | 4 | 4 | 4 | 4 | 4 | 4 | 0 | 0 | 0 |

Figure 5A:
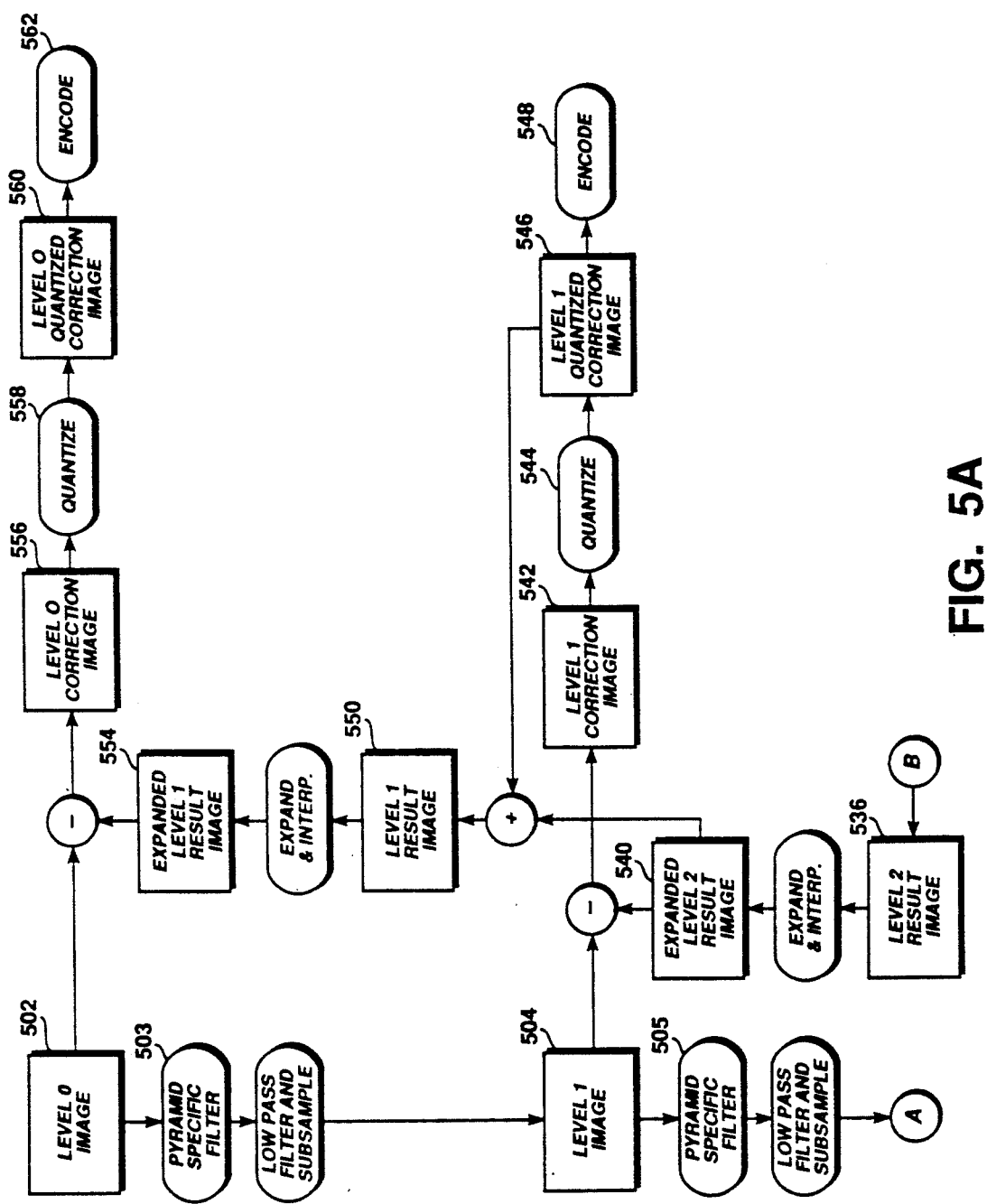
FIGS. 5A and 5B show a block diagram of an encoding method in accordance with the present invention.
Figure 5B:
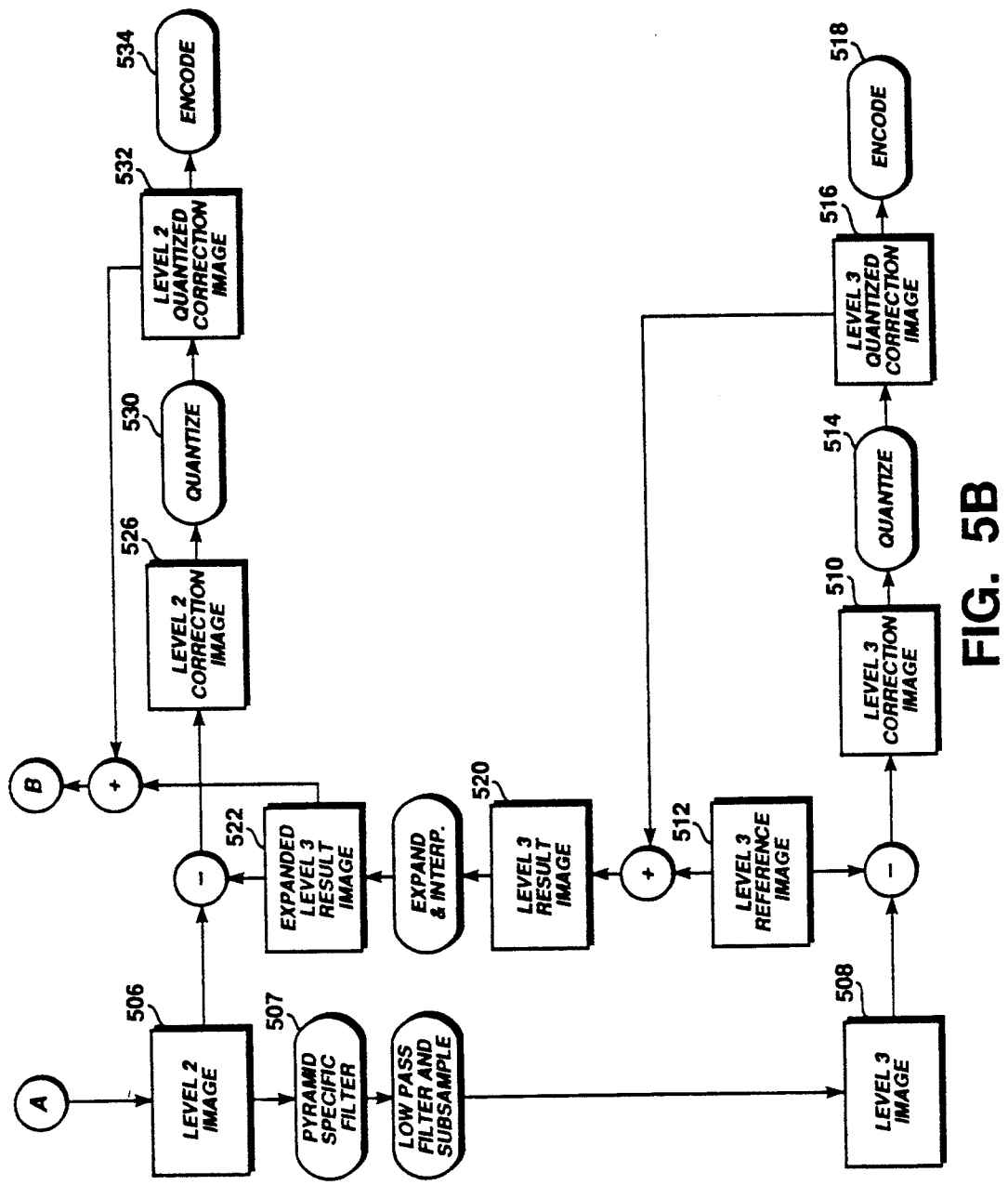

It is thus seen in Table III, that the point in Image disappears in Image', but the edges remain Referring to FIGS. 5A, 5B, there is shown a pyramidal encoding method for encoding an image in accordance with the present invention. It is to be understood that the pyramid specific filter of the present invention may be employed in connection with only the full resolution level of an image, or with the full resolution level and one or more lower levels, or still alternatively, with only lower resolution levels of the image. As described below, images having high frequency features at full or lower resolution levels can be subjected to pyramid specific filtering between one or more decimation levels. Finally, it is to be understood that the present invention may be employed to enhance pyramidal encoding of still images as well to enhance pyramidal encoding of inter-frame image information. Individual images, for example photographs, are encoded as stills as are the first images of scenes in a sequence.

In FIGS. 5A, 5B there is shown a block diagram depicting a preferred embodiment of an image encoding method in accordance with the present invention. A full resolution image, hereinafter referred to as the level 0 image 502, is filtered by pyramid specific filter 503 and then passed through a low pass filter and resolved (sub-sampled) into an image having a lower resolution, hereinafter referred to as the level 1 image 504. The level 1 image 504 is filtered by pyramid specific filter 505 and then passed through a low pass filter and resolved into a still lower resolution image, hereinafter referred to as the level 2 image 506. The level 2 image 506 is filtered by pyramid specific filter 507 and then passed through a low pass filter and resolved into yet a lower resolution image which, in a preferred embodiment, is the lowest resolution image, hereinafter referred to as the level 3 image 508. In the preferred embodiment, the level 1 image 504 has approximately ¼ the number of pixels of the full resolution level 0 image 502; the level 2 image 506 has approximately 1/16 the number of pixels of the full resolution level 0 image 502; and the level 3 image 508 has approximately 1/64 the number of pixels of the full resolution level 0 image 502. Although in the preferred embodiment the image 502 is resolved into three lower resolution images, resolving the image into fewer or more levels of resolution is also within the scope and contemplation of the present invention. Accordingly, the present invention encompasses resolving an image into at least one lower level of resolution.

A level 3 correction image 510 is formed by subtracting the value of each pixel in a level 3 reference image 512 from the value of each corresponding pixel in the level 3 image 508. The level 3 reference image 512 comprises an array of pixels all having the same value. In the preferred embodiment, the range of possible pixel values in the images 502, 504, 506 and 508 is from 0 to 255. It is preferred that the value of the pixels in the level 3 reference image 512 be midpoint in the total pixel value range. Accordingly, each pixel of the level 3 reference image 512 has a value of 128. As a result, the values of the pixels in the level 3 correction image, hereinafter referred to as difference values D, are signed and range from −128 to +127. The difference value D of each pixel in the level 3 correction image 510 is then quantized (514) to form a level 3 quantized correction image 516. The level 3 quantized correction image 516 is encoded (518) as will be subsequently described.

Alternatively, a difference constant value of the pixels in the reference image of lowest resolution may be chosen based upon the actual pixel values in image 502, and that chosen value transmitted in the bitstream. For example, the average value of the actual pixel values in image 502 may be chosen and transmitted in the bitstream.

A level 3 result image 520 is formed by adding the value of each pixel in the level 3 quantized correction image 516 to the value of each corresponding pixel in the level 3 reference image 512. The level 3 result image 520 is expanded to form an expanded level 3 result image 522. The vacant pixel locations created by the expansion are filled by pixels whose values are preferably determined by linear interpolation. This is accomplished for example, by adding the values of the pixels on either side of the vacant pixel location, dividing the resultant sum by 2 and then inserting the result in the location of the vacant pixel. It should be noted, however, that other methods of interpolation could be used and are considered to be within the scope of the present invention. For example, polynomial interpolation tends to reduce average sizes of pixels in the correction image thereby decreasing the bit rate. In the preferred embodiment, each lower level of resolution contains ¼ the number of pixels of that of the higher resolution level. However, it should be noted that the number of pixels in each lower resolution level could be reduced by a factor such as two, three, or five, including non-integral ratios and such is considered within the scope of the present invention. In cases such as these, polynomial interpolation may be especially useful.

Level 2 correction image 526 is formed by subtracting the value of each pixel in a level 2 reference image which, in the preferred embodiment, is the expanded level 3 result image 22, from the value of each corresponding pixel in the level 2 image 506. Although the value of each pixel in the level 2 correction imaged 526, which is also a signed difference value D, could range from $-255$ to $+255$, it is preferred that values outside the range of from $-128$ to $+127$ are clipped thereby limiting the difference values D to a range of from $-128$ to $+127$. The difference values D are quantized (530) to form a level 2 quantized correction image 532. The level 2 quantized correction image 532 is encoded (534) as will be subsequently described.

A level 2 result image 536 is formed by algebraically adding the signed difference value D of each pixel in the level 2 quantized correction image 532 to the value of each corresponding pixel in the expanded level 3 result image 522. The level 2 result image 536 is expanded to form an expanded level 2 result image 540. The vacant pixel locations in the expanded level 2 result image array are filled as previously described with respect to the expansion of the level 3 result image 520. A level 1 correction image 542 is formed by subtracting the value of each pixel in a level 1 reference image which, in the preferred embodiment, is the expanded level 2 result image 540, from the value of each corresponding pixel in the level 1 image 504. The value of each pixel in the level 1 correction image 542, which is also a signed difference value D ranging, in the preferred embodiment, from $-128$ to $+127$, is quantized (544) to form a level 1 quantized correction image 546 which is then encoded (548) as will be subsequently described.

A level 1 result image 550 is formed by algebraically adding the signed difference value D of each pixel in the level 1 quantized correction image 546 to the value of each corresponding pixel in the expanded level 2 result image 540. The level 1 result image 550 is expanded to form an expanded level 1 result image 554. The vacant pixel locations in the expanded level 1 result image are filled as previously described with respect to the expansion of the level 3 result image 520. A full resolution level 0 correction image 556 is formed by subtracting the value of each pixel in a full resolution level 0 reference image which, in the preferred embodiment, is the expanded level 1 result image 554, from the value of each corresponding pixel in the level 0 image 502. The value of each pixel in the level 0 correction image 556, which is also a signed difference value D ranging, in the preferred embodiment, from $-128$ to $+127$, is quantized (558) to form a level 0 quantized correction image 560 which is encoded (562) as will be subsequently described.

In the description of the preferred embodiment set forth above, the quantized correction image for each resolution level is based upon the expanded result image of the next lower resolution level. However, the quantized correction image at a particular resolution level could be based upon a result image expanded from a level which is two or more levels of resolution lower and as such is considered within the scope of the present invention. For example, the level 3 result image could be expanded to the level 1 resolution. The level 1 correction image would then be formed by subtracting the value of each pixel in the expanded level 3 result image (which in this case is now the level 1 reference image) from the value of each corresponding pixel in the level 1 image.

Although, in the description set forth above, a full resolution correction image is formed, quantized and encoded, such processing of the image at full resolution may not be necessary or desirable to achieve a high quality result. Accordingly, in an alternative preferred embodiment of the present invention, the processing is performed at levels of resolution lower than full resolution. For example, a level 1 image is not expanded to form a full resolution reference image. Nor is a level 0 correction image formed and quantized to form a full resolution quantized correction image to obtain a final type using monads. Quantized correction images may also be encoded using DCT, wavelets or subband coding.

It should be noted that the quantized correction image for each level could be divided into linear fill and non-null regions and such is considered within the scope of the present invention. Where the regions are so divided, a null region could be considered a special case of linear fill. It should be further noted that other techniques for still image encoding known in the art could be used; for example, the discrete cosine transform (DCT) technique; and such is also considered to be within the scope of the present invention. In the preferred embodiment, the code type used is explicitly set forth in the bit stream. Accordingly, the decoder recognizes the code type used in connection with each level of resolution by reading a code in the bit stream. This permits any appropriate code type to be used in encoding any level of resolution.

In the preferred embodiment, the quantized correction image having the lowest level of resolution, level 3, is encoded as a special case of the general encoding procedure described above. That is, the entire level 3 quantized correction image is treated as a non-null region which is encoded using a predetermined code type. In the preferred embodiment, the predetermined code type is DPCM. However, it is noted that the lowest resolution level quantized correction image could be divided into null and non-null regions as will be subsequently described with respect to higher resolution quantized correction image levels and such is considered to be within the scope and contemplation of the present invention. Also, instead of predetermining a code type such as DPCM, an alternate embodiment of the present invention entails encoding each non-null region using different vector quantization code types such as DPCM, DYADS and QUADS, determining the best code type under the circumstances, then transmitting a code identifying the code type ultimately employed.

In the preferred embodiment, the 8×8 pixel blocks are grouped into null and non-null regions preferably using a binary tree encoding technique similar to that described elsewhere in this detailed description. The major difference is that in the binary tree encoding technique employed with the quantized correction images, the image is split up in a way so as to maximize the number of pixels in null regions, while minimizing the total number of regions created. In the preferred embodiment, splits are made only along the borders of the 8×8 pixel blocks and not through the blocks. Consequently, a pixel block which contains one or more non-null pixels would lie entirely within a non-null region. Although binary tree encoding is preferred, other methods of forming regions may be used such as, for example quad tree decomposition; and such are considered to be within the scope of the present invention.

In a preferred embodiment, pyramid specific filters 503, 505, 507 function by separately processing images 502, 504, 506 in separate one-dimensional directions in accordance with the image as will be subsequently described. Also in this alternate preferred embodiment, the image may be resolved to only two levels of resolution lower than full resolution. That is, the full resolution level 0 image is only resolved into the level 1 image 504 and the level 2 image 506. Consequently, level 2 is the lowest level of resolution in this embodiment. Accordingly, the level 2 reference image comprises an array of pixels all having the same value as previously described with respect to the level 3 reference image 512.

The quantized correction images of the different resolution levels are encoded as follows. The quantized correction image for each level is divided into m×n pixel blocks which are grouped into null and non-null regions. In the preferred embodiment m=8 and n=8. A null region is a region in which all pixel values have been quantized to zero. In a non-null region, at least one pixel had a non-zero quantized value. The non-null regions are encoded using a code type, preferably a vector quantization code type such as, for example, quad, dyad or DPCM. A vector represents one or more pixel values, one being a special case. For example monads, dyads and quads represent vectors of one, two and four pixels respectively. A vector can be applied directly, or could employ spacial prediction. For example, DPCM is used for monads, where each monad is predicted by the immediately preceding monad. In this context, DPCM is considered to be a special case of a vector quantization code example described in connection with FIG. 4 above. Thus, pyramid specific filter 503 first acts on each row i of pixels in image 502 by processing each pixel in row i as follows. For each pixel $P_{i,j}$ pyramid specific filter 503 calculates the mean, m, and variance, v, of $P_{i,j-2}$, $P_{i,j-1}$, $P_{i,j+1}$, $P_{i,j+2}$, i.e., the two pixels in row i on either side of pixel $P_{i,j}$. Based on these mean and variance values a weight, w is calculated as follows:

$$w = exp(-k*(P_{i,j}-m)^2/v)$$

Where, k is a constant having a typical value of 0.3. A value $P'_{i,j}$ representing the corresponding value of pixel $P_{i,j}$ in an intermediate image is then calculated using surrounding pixels $P_{i,j-1}$, $P_{i,j+1}$ as follows:

$$P'_{i,j} = w*P_{i,j} + (1-w)*(P_{i,j-1} + P_{i,j+1})/2$$

After all pixels in all rows i have been processed in accordance with the above, each pixel $P'_{i,j}$ in each row j is then processed by calculating the mean, m, and variance, v, of $P'_{i-2,j}$, $P'_{i-1,j}$, $P'_{i+1,j}$, $P'_{i+2,j}$, i.e., the two pixels in column j both above and below pixel $P'_{i,j}$. Based on these mean and variance values a weight, w is calculated as follows:

$$w = exp(-k*(P_{i,j}-m)^2/v)$$

Where, k is a constant having a typical value of 0.3. A value $P''_{ij}$ representing the corresponding value of pixel $P'_{ij}$ in a filtered image is then calculated using surrounding pixels $P'_{i-1,j}$, $P'_{i+1,j}$ as follows $$P''_{i,j} = w*P'_{i,j} + (1-w)*(P'_{i-1,j} + P'_{i+1,j})/2$$

Pixels $P''_{i,j}$ are then passed through a low pass filter and subsampled to produce level 1 image 504.

Pyramid specific filters 505, 507 likewise function according to the same method as pyramid specific filter 503 to respectively derive images 506, 508. Thus, pyramid specific filter 505 acts on each row i of pixels in image 504 by processing each pixel in row i as described above. Thereafter, each pixel in each row j is then processed to yield pixels which are then passed through a low pass filter subsampled to produce level 2 image 506. Finally, pyramid specific filter 507 acts on each row i of pixels in image 506 by processing each pixel in row i as described above. Thereafter, each pixel in each row j is then processed to yield pixels which are then passed through a low pass filter and subsampled to produce level 3 image 508. Pyramid specific filters 503, 505, 507 are especially useful for filtering high frequency features approximately one pixel thick. It should be noted, however, that the present invention is not limited to the filtering of high frequency features only one pixel thick or to the particular pyramid specific filters disclosed herein. Instead, it is also within the scope of the present invention to filter high frequency features of other dimensions from image frames prior to their decimation where such filtering enhances encoding efficiency.

The present invention may be embodied in other specific forms without departing from the spirit or essential attributes of the invention. Accordingly, reference should be made to the appended claims, rather than the foregoing specification, as indicating the scope of the invention.

What is claimed is:

1. A method for encoding an image having at least one high frequency feature comprising the steps of:
   (a) filtering said image with a non-linear filter targeted at said at least one high resolution feature to produce a filtered image, wherein said at least one high resolution feature is selected from a group comprising lines and points, and wherein said filtering is targeted at said at least one high resolution feature and not at edges;
   (b) low pass filtering and subsampling said filtered image into at least one lower level of resolution;
   (c) encoding a correction image at said at least one lower level of resolution;
   (d) producing an expanded result image from said correction image, said expanded result image having the same level of resolution as said image; and
   (e) encoding at the level of resolution of said image the difference between said image and said expanded result image.

2. The method in accordance with claim 1 wherein step c comprises the steps of:
   (i) dividing said at least one lower level of resolution which is encoded into null and non-null regions;
   (ii) encoding said regions using binary tree decomposition;
   (iii) determining vector values describing the pixel values in said non-null regions; and
   (iv) quantizing said vector values.

3. The method in accordance with claim 2 wherein said vector values include DYADS, QUADS, and DPCM.

4. The method of claim 1, wherein said at least one high frequency feature is less than two pixels in thickness.

5. The method of claim 1, wherein said image is a two dimensional array of pixels and said filtering step comprises one dimensional processing of each row and column in said image.

6. The method of claim 1, wherein said image is a full resolution frame selected from a sequence of frames.

7. The method of claim 1, wherein said image has been obtained by decimating a full resolution image selected from a sequence of frames.

8. The method of claim 1, wherein step (c) comprises encoding said correction image at said at least one lower level of resolution using DPCM, vector quantization, DCT, wavelets, pyramidal coding or subband coding.

9. The method of claim 1, wherein said image is an interframe error image representing the difference between a predicted image obtained through motion compensation analysis and a target image.

10. The method of claim 1, wherein said image is an interframe error image representing the difference between a preceding image and a target image.

11. A method for filtering an image having at least one high frequency feature comprising the steps of:
    (a) filtering said image with a non-linear filter targeted at said at least one high resolution feature to produce a filtered image, wherein said at least one high resolution feature is selected from a group comprising lines and points, and wherein said filtering is targeted at said at least one high resolution feature and not at edges;
    (b) resolving said filtered image into at least one lower level of resolution; and
    (c) analyzing the difference of said image and the expansion of the result of step (b) to the level of resolution of said image.

12. A method for filtering an image having at least one high frequency feature comprising the steps of:
    (a) filtering said image with a non-linear filter targeted at said at least one high resolution feature to produce a filtered image, wherein said at least one high resolution feature is selected from a group comprising lines and points, and wherein said filtering is targeted at said at least one high resolution feature and not at edges;
    (b) resolving said filtered image into at least one lower level of resolution; and
    (c) analyzing said filtered image at said at least one lower level of resolution.

13. A method for filtering an image having at least one high frequency feature comprising the steps of:
    (a) filtering said image with a non-linear filter targeted at said at least one high resolution feature to produce a filtered image, wherein said at least one high resolution feature is selected from a group comprising lines and points, and wherein said filtering is targeted at said at least one high resolution feature and not at edges;
    (b) producing an intermediate image by subjecting said filtered image to low pass filtering; and
    (c) analyzing the difference between the result of step (a) and the result of step (b).

14. An apparatus for encoding an image having at least one high frequency feature comprising:
    (a) means for filtering said image with a non-linear filter targeted at said at least one high resolution feature to produce a filtered image, wherein said at least one high resolution feature is selected from a group comprising lines and points, and wherein said filtering is targeted at said at least one high resolution feature and not at edges;
    (b) means for low pass filtering and subsampling said filtered image into at least one lower level of resolution;
    (c) means for encoding a correction image at said at least one lower level of resolution;
    (d) means for producing an expanded result image from said correction image, said expanded result image having the same level of resolution as said image; and
    (e) means for encoding at the level of resolution of said image the difference between said image and said expanded result image.

* * * * *